US010620725B2

(12) United States Patent
Siddiqui et al.

(10) Patent No.: US 10,620,725 B2
(45) Date of Patent: Apr. 14, 2020

(54) SYSTEM AND METHOD FOR DYNAMIC MODE SWITCHING IN AN ACTIVE STYLUS

(71) Applicant: Dell Products L.P., Round Rock, TX (US)

(72) Inventors: Asim M. Siddiqui, Cedar Park, TX (US); Thomas Lanzoni, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 15/435,480

(22) Filed: Feb. 17, 2017

(65) Prior Publication Data

US 2018/0239444 A1 Aug. 23, 2018

(51) Int. Cl.
G06F 3/0354 (2013.01)
G06F 3/041 (2006.01)
G06F 1/32 (2019.01)
G06F 3/038 (2013.01)
G06F 1/3215 (2019.01)
G06F 3/0488 (2013.01)
G06F 1/3234 (2019.01)
G06F 1/3206 (2019.01)
G06F 1/3203 (2019.01)
G06F 1/3212 (2019.01)

(52) U.S. Cl.
CPC .......... G06F 3/0383 (2013.01); G06F 1/3203 (2013.01); G06F 1/3206 (2013.01); G06F 1/3212 (2013.01); G06F 1/3215 (2013.01); G06F 1/3259 (2013.01); G06F 1/3262 (2013.01); G06F 3/03545 (2013.01); G06F 3/0416 (2013.01); G06F 3/04883 (2013.01); G06F 2203/04101 (2013.01)

(58) Field of Classification Search
CPC .... G06F 3/03545; G06F 3/3206; G06F 3/038; G06F 3/041; G06F 3/3212; G06F 3/3215; G06F 3/3203; G06F 3/325; G06F 3/3262; G06F 3/0412; G06F 3/0416; G06F 3/04883
See application file for complete search history.

(56) References Cited

U.S. PATENT DOCUMENTS 8,773,405 B1 * 7/2014 Ryshtun .............. G06F 3/03545
  178/19.03
9,201,520 B2 * 12/2015 Benko ................. G06F 3/03545
(Continued)

Primary Examiner — Dismery Mercedes
(74) Attorney, Agent, or Firm — Baker Botts L.L.P.

(57) ABSTRACT

A disclosed information handling system includes a touch controller and a touch device. The touch controller may include circuitry to establish a communication link with a stylus, to determine that the stylus should operate in a first one of multiple stylus modes, the first mode defining a set of stylus features to be enabled on the stylus in the first mode, to communicate, to the stylus, an indication that the stylus is to be configured in the first mode, to determine an effect of digital inking by the stylus, dependent on stylus features enabled in the first mode, to determine that the stylus should operate in a second stylus mode, the second mode defining at least a subset of stylus features to be disabled on the stylus in the second mode, and to communicate, to the stylus, an indication that the stylus is to be configured in the second mode.

20 Claims, 8 Drawing Sheets

(56) References Cited

U.S. PATENT DOCUMENTS

| | | | | |
|---|---|---|---|---|
| 9,760,187 | B2* | 9/2017 | Havilio | G06F 3/03545 |
| 10,082,888 | B2* | 9/2018 | Knee | G06F 3/03545 |
| 2006/0028458 | A1* | 2/2006 | King | G02B 26/06 |
| | | | | 345/179 |
| 2006/0284854 | A1* | 12/2006 | Cheng | G06F 3/03545 |
| | | | | 345/173 |
| 2007/0003168 | A1* | 1/2007 | Oliver | G06F 3/03545 |
| | | | | 382/314 |
| 2008/0252621 | A1* | 10/2008 | Shipton | G01D 5/3473 |
| | | | | 345/179 |
| 2012/0062520 | A1* | 3/2012 | Knee | G06F 1/3259 |
| | | | | 345/179 |
| 2013/0106714 | A1* | 5/2013 | Shahparnia | G06F 1/3203 |
| | | | | 345/173 |
| 2014/0184567 | A1* | 7/2014 | Zachut | G06F 3/03545 |
| | | | | 345/174 |
| 2014/0253468 | A1* | 9/2014 | Havilio | G06F 3/03545 |
| | | | | 345/173 |
| 2014/0267186 | A1* | 9/2014 | Kreek | G06F 3/03545 |
| | | | | 345/179 |
| 2015/0185879 | A1* | 7/2015 | Aurongzeb | G06F 3/03545 |
| | | | | 345/179 |
| 2015/0293615 | A1* | 10/2015 | Gerber | G06F 3/03545 |
| | | | | 345/173 |
| 2015/0338940 | A1* | 11/2015 | Vong | H04L 65/403 |
| | | | | 345/179 |
| 2015/0363012 | A1* | 12/2015 | Sundara-Rajan | G06F 3/038 |
| | | | | 345/179 |
| 2016/0162048 | A1* | 6/2016 | David | G06F 3/03545 |
| | | | | 345/179 |
| 2016/0195944 | A1* | 7/2016 | Gur | G06F 3/03545 |
| | | | | 345/174 |
| 2016/0259766 | A1* | 9/2016 | Ivanov | G06F 16/5866 |
| 2016/0282965 | A1* | 9/2016 | Jensen | G06F 3/03545 |
| 2017/0068339 | A1* | 3/2017 | Zimmerman | G06F 3/0383 |
| 2017/0315631 | A1* | 11/2017 | Pourbigharaz | G06F 3/03545 |
| 2018/0232068 | A1* | 8/2018 | Gordon | G06F 3/0416 |

* cited by examiner

SYSTEM AND METHOD FOR DYNAMIC MODE SWITCHING IN AN ACTIVE STYLUS

BACKGROUND

Field of the Disclosure

This disclosure relates generally to information handling systems and, more particularly, to systems and methods for dynamically switching modes in an active stylus based on application context and usage.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the demand for touch enabled systems, such as tablet computers, notebook computers, smart phones, and other mobile devices continues to increase, so too does the demand for active styluses. An active stylus can contribute to a natural and engaging user experience when supported in various applications that run on such devices. The use of active projective capacitive (PCAP) can lead to more precision and accuracy, but requires a stylus to include active circuitry and an energy source, such as a battery. The battery life of an active stylus varies dependent upon its usage.

SUMMARY

In one aspect, a disclosed information handling system is for dynamically switching the mode in which a stylus device operates. In at least some embodiments, the information handling system may include a touch controller, and a touch device. The touch device may include circuitry for enabling, in conjunction with the touch controller, input to the information handling system via touch functionality. The touch controller may include circuitry to establish a communication link with a stylus device to be used with the touch device, and to determine that the stylus device is to operate in a first one of a plurality of stylus modes, where the first stylus mode defines a first set of stylus features to be supported on the touch controller and enabled on the stylus device when the stylus device operates in the first stylus mode. The touch controller may include circuitry to communicate, to the stylus device, an indication that the stylus device is to be configured for operation in the first stylus mode, to determine, while the stylus device operates in the first stylus mode, an effect of digital inking by the stylus device on the touch device, dependent on the stylus features included in the first set of stylus features, to determine that the stylus device is to operate in a second one of the plurality of stylus modes, where the second stylus mode defines at least a subset of the stylus features in the first set of stylus features that are to be disabled on the stylus device when the stylus device operates in the second stylus mode, and to communicate, to the stylus device, an indication that the stylus device is to be configured for operation in the second stylus mode.

In any of the disclosed embodiments, to determine that the stylus device is to operate in the first stylus mode, the touch controller may include circuitry to detect that the stylus device has come into proximity with the touch device, and to select, as an initial stylus mode, the first stylus mode. The first stylus mode may be a default stylus mode in which all battery-consuming stylus features implemented on the stylus device are enabled.

In any of the disclosed embodiments, to determine that the stylus device is to operate in the first stylus mode, the touch controller may include circuitry to detect a movement, a position, or an orientation of the stylus device that represents a gesture associated with the first stylus mode.

In any of the disclosed embodiments, to determine that the stylus device is to operate in the first stylus mode, the touch controller may include circuitry to determine that a first application executing on the information handling system supports use of one or more of the stylus features in the subset of stylus features that are to be disabled on the stylus device when the stylus device operates in the second stylus mode. To determine that the stylus device is to operate in the second stylus mode, the touch controller may include circuitry to determine that a second application executing on the information handling system does not support use of the stylus features in the subset of stylus features that are to be disabled on the stylus device when the stylus device operates in the second stylus mode.

In any of the disclosed embodiments, to determine that the stylus device is to operate in the second stylus mode, the touch controller may include circuitry to receive, from the stylus device, information representing a state-of-charge of a battery providing energy to the stylus device, the information indicating that the state-of-charge of the battery is below a predetermined state-of-charge threshold.

In any of the disclosed embodiments, to communicate, to the stylus device, an indication that the stylus device is to be configured for operation in the first stylus mode, the touch controller may include circuitry to transmit a beacon signal to the stylus device, the beacon signal encoding information representing a command to configure the stylus device for operation in the first stylus mode.

In any of the disclosed embodiments, the information handling system may further include a stylus controller. The stylus controller may include circuitry to receive, from the touch controller, the indication that the stylus device is to be configured for operation in the first stylus mode, to configure the stylus device for operation in the first stylus mode, including circuitry to enable the stylus features in the first set of stylus features, to receive, from the touch controller, the indication that the stylus device is to be configured for operation in the second stylus mode, and to configure the stylus device for operation in the second stylus mode, including circuitry to disable the stylus features in the subset of the first set of stylus features.

In any of the disclosed embodiments, the information handling system may further include a stylus controller. The stylus controller may include circuitry to configure the stylus device for operation in the second stylus mode in response to a determination that the stylus device is not in proximity to the touch device, or in response to a determination that a state-of-charge of a battery providing energy to the stylus device is below a predetermined state-of-charge threshold.

In any of the disclosed embodiments, the information handling system may further include a stylus controller. The stylus controller may include circuitry to receive, from a user input mechanism of the stylus device, an indication that the stylus device is to operate in the second stylus mode, and to transmit a beacon signal to the touch controller, the beacon signal encoding information indicating that the stylus device is to be configured for operation in the second stylus mode. To determine that the stylus device is to operate in the second stylus mode, the touch controller may include circuitry to receive, from the stylus device, the beacon signal encoding information indicating that the stylus device is to be configured for operation in the second stylus mode.

In another aspect, a disclosed method is for dynamically switching the mode in which a stylus device operates. In at least some embodiments, the method may include, in an information handling system establishing a communication link between a touch controller and a stylus device, the stylus device to be used with a touch device to provide input to the information handling system, determining that the stylus device is to operate in a first one of a plurality of stylus modes, where the first stylus mode defines a first set of stylus features to be supported on the touch controller and enabled on the stylus device when the stylus device operates in the first stylus mode, communicating, to the stylus device, an indication that the stylus device is to be configured for operation in the first stylus mode, determining, while the stylus device operates in the first stylus mode, an effect of digital inking by the stylus device on the touch device, dependent on the stylus features included in the first set of stylus features, determining that the stylus device is to operate in a second one of the plurality of stylus modes, where the second stylus mode defines at least a subset of the stylus features in the first set of stylus features that are to be disabled on the stylus device when the stylus device operates in the second stylus mode, and communicating, to the stylus device, an indication that the stylus device is to be configured for operation in the second stylus mode.

In any of the disclosed embodiments, determining that the stylus device is to operate in the first stylus mode may include detecting that the stylus device has come into proximity with the touch device, and selecting, as an initial stylus mode, the first stylus mode. The first stylus mode may be a default stylus mode in which all battery-consuming stylus features implemented on the stylus device are enabled.

In any of the disclosed embodiments, determining that the stylus device is to operate in the first stylus mode may include determining that a first application executing on the information handling system supports use of one or more of the stylus features in the subset of stylus features that are to be disabled on the stylus device when the stylus device operates in the second stylus mode. Determining that the stylus device is to operate in the second stylus mode may include determining that a second application executing on the information handling system does not support use of the stylus features in the subset of stylus features that are to be disabled on the stylus device when the stylus device operates in the second stylus mode.

In any of the disclosed embodiments, determining that the stylus device is to operate in the second stylus mode may include receiving, from the stylus device, information representing a state-of-charge of a battery providing energy to the stylus device, the information indicating that the state-of-charge of the battery is below a predetermined state-of-charge threshold.

In any of the disclosed embodiments, communicating, to the stylus device, an indication that the stylus device is to be configured for operation in the first stylus mode may include transmitting a beacon signal to the stylus device, the beacon signal encoding information representing a command to configure the stylus device for operation in the first stylus mode.

In any of the disclosed embodiments, the method may further include configuring the stylus device for operation in the first stylus mode, including enabling the stylus features in the first set of stylus features, in response to the indication that the stylus device is to be configured for operation in the first stylus mode. The method may also include configuring the stylus device for operation in the second stylus mode, including disabling the stylus features in the subset of the first set of stylus features, in response to the indication that the stylus device is to be configured for operation in the first stylus mode.

In yet another aspect, a disclosed non-transitory, computer-readable medium is for dynamically switching the mode in which a stylus device operates. In at least some embodiments, at least one non-transitory, computer-readable medium may store program instructions that when executed by one or more processors cause the processors to perform establishing a communication link between a touch controller for a touch device and a stylus controller for a stylus device to be used with the touch device, determining that the stylus device is to operate in a first one of a plurality of stylus modes, where the first stylus mode defines a first set of stylus features to be supported on the touch controller and enabled on the stylus device when the stylus device operates in the first stylus mode, communicating, to the stylus controller, an indication that the stylus device is to be configured for operation in the first stylus mode, determining, while the stylus device operates in the first stylus mode, an effect of digital inking by the stylus device on a touch device, dependent on the stylus features included in the first set of stylus features, determining that the stylus device is to operate in a second one of the plurality of stylus modes, where the second stylus mode defines at least a subset of the stylus features in the first set of stylus features that are to be disabled on the stylus device when the stylus device operates in the second stylus mode, and communicating, to the stylus controller, an indication that the stylus device is to be configured for operation in the second stylus mode.

In any of the disclosed embodiments, determining that the stylus device is to operate in the first stylus mode may include determining that the stylus device has come into proximity with the touch device, and selecting, as an initial stylus mode, the first stylus mode. The first stylus mode may be a default stylus mode in which all battery-consuming stylus features implemented on the stylus device are enabled.

In any of the disclosed embodiments, determining that the stylus device is to operate in the first stylus mode may include receiving, through an application programming interface, information indicating that a first application executing on the one or more processors supports use of one or more of the stylus features in the subset of stylus features that are to be disabled on the stylus device when the stylus device operates in the second stylus mode. Determining that the stylus device is to operate in the second stylus mode may include receiving, through an application programming interface, information indicating that a second application executing on the one or more processors does not support use of the stylus features in the subset of stylus features that are to be disabled on the stylus device when the stylus device operates in the second stylus mode.

In any of the disclosed embodiments, determining that the stylus device is to operate in the second stylus mode may include receiving, from the stylus controller, information representing a state-of-charge of a battery providing energy to the stylus device, the information indicating that the state-of-charge of the battery is below a predetermined state-of-charge threshold.

In any of the disclosed embodiments, communicating, to the stylus controller, an indication that the stylus device is to be configured for operation in the first stylus mode may include sending, to the stylus controller, information representing a command to configure the stylus device for operation in the first stylus mode.

BRIEF DESCRIPTION OF THE DRAWINGS

For a more complete understanding of the present invention and its features and advantages, reference is now made to the following description, taken in conjunction with the accompanying drawings, in which.

Figure 1:
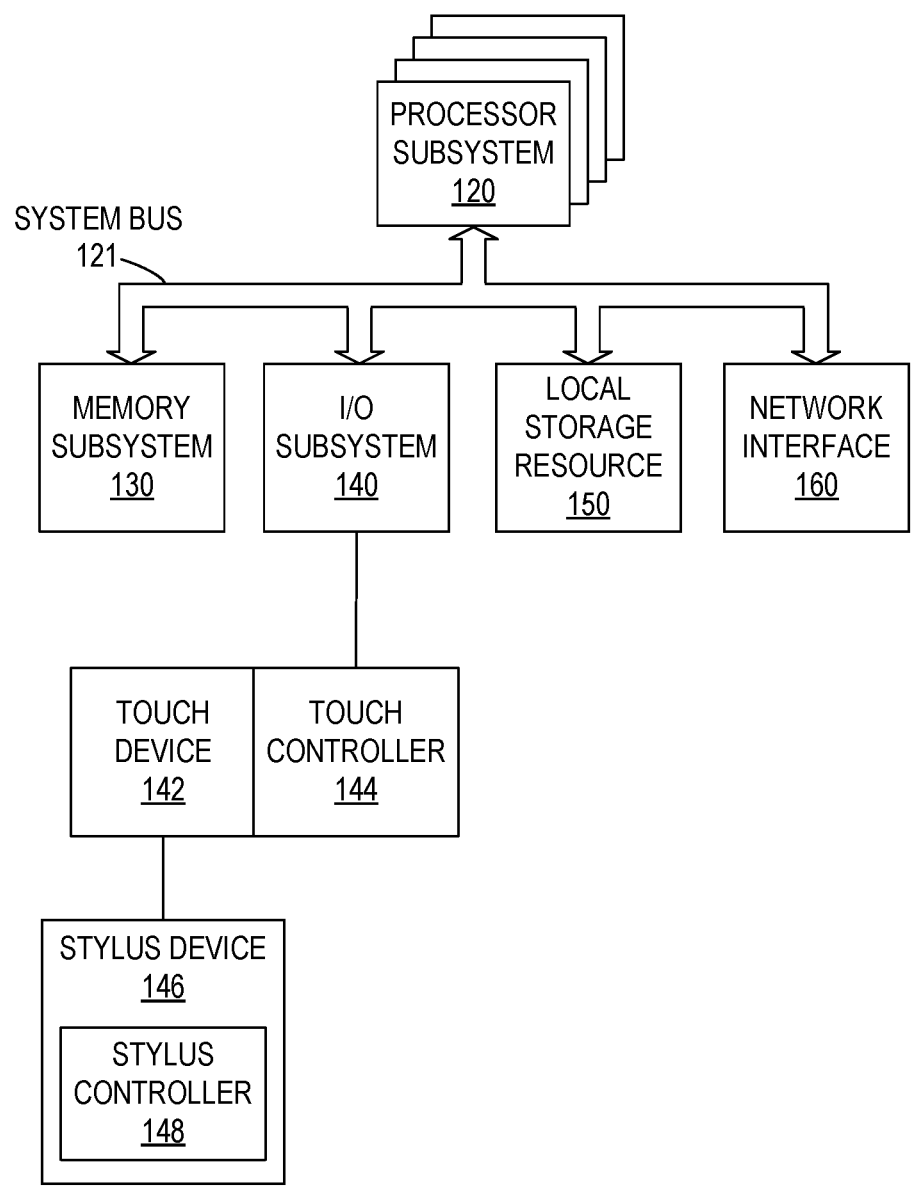
FIG. 1 is a block diagram of selected elements of an embodiment of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Some information handling systems include a touch enabled device (sometimes referred to herein as a "touch device") through which user input is provided to the system. An active stylus may be used to perform "digital inking" when it comes in contact with, or in proximity to, a touch device. In many existing systems, when the energy source (e.g., a battery) of an active stylus system is depleted, the stylus is no longer functional. In these systems, the user is typically not given any advance warning that the battery is about to be depleted leaving a user without a functional stylus.

In at least some embodiments of the systems described herein, an active stylus device may operate in any of multiple stylus modes, some of which may preserve the battery life of the stylus device by disabling one or more battery-consuming features of the stylus device. For example, in a standard or default stylus mode (sometimes referred to herein as a "full-feature" stylus mode), all stylus features that are implemented on the stylus device, including those that are battery-consuming, may be enabled. However, in each of one or more other stylus modes (sometimes referred to herein as "low power" or "lower feature" stylus modes), some or all of the battery-consuming features of the stylus device may be disabled. In some embodiments, a touch device (or a touch controller or other component of a touch device) may determine that a stylus device can or should change stylus modes. In other embodiments, a stylus device itself (or a stylus controller thereof) may determine that it can or should change the stylus mode in which it is operating. In some embodiments, if the stylus mode in which a multiple-mode active stylus device is operating is changed from a full-feature mode to a low power or lower feature mode, the battery life of the stylus device may be extended, leading to a better user experience. Various methods for determining when and whether to dynamically switch stylus modes in an active stylus are described in more detail below.

Particular embodiments are best understood by reference to FIGS. 1-8, where like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown) or using a touch device 142 and a stylus device 146.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces.

As shown, I/O subsystem 140 may include touch device 142 and touch controller 144. Touch device 142 may include circuitry for enabling touch functionality in conjunction with an input/output device that is driven by touch controller 144. For example, in some embodiments, touch device 142 may be a touch enabled screen (e.g., a touchscreen) that also serves as a display device. In other embodiments, touch device 142 may be a standalone touch pad or touch panel (e.g., without display capability) through which a user can provide input to information handling system 100 using a finger, an active stylus device, or a passive stylus device. It is noted that when information handling system 100 is a laptop computer with an integrated display device, touch controller 144 may provide connectivity for the integrated display that includes a touch device 142 and/or for an external touch device 142.

As shown, I/O subsystem 140 may also include stylus device 146 and stylus controller 148. In at least some embodiments, stylus device 146 may be an active stylus usable to provide input to the information handling system via touch functionality. In at least some embodiments, touch controller 144 may determine the effects of digital writing, digital drawing or digital inking (any of which may be referred herein as "digital inking") by stylus device 146 when in in contact with, or in proximity to, touch device 142, dependent on the stylus features that are implemented and enabled on stylus device 146 and the stylus features that are supported by touch controller 144 and/or the operating system and any applications executing on information handling system 100 at a given point in time.

In at least some embodiments or the present disclosure, an active stylus may be able to operate in two or more different stylus modes, each of which defines which, if any, battery-consuming stylus features are enabled for use and/or which, if any, battery-consuming stylus features are disabled while in that stylus mode. Systems and methods for dynamically switching between those modes are described herein, according to various embodiments. As described in more detail below, the selection of a full-feature stylus mode, or a low power or lower feature stylus mode may be based on the application with which the stylus is being used, the state-of-charge of the stylus battery, and/or other criteria. In one example, after switching the stylus mode in which an active stylus operates from a full-feature stylus mode to a lower feature stylus mode, the stylus device may consume less power, but may still be functional in the context of the application with which it is being used. The use of a multiple-mode active stylus, as described herein, may preserve the battery life of the stylus device by contextually switching the mode of the stylus.

Figure 2:
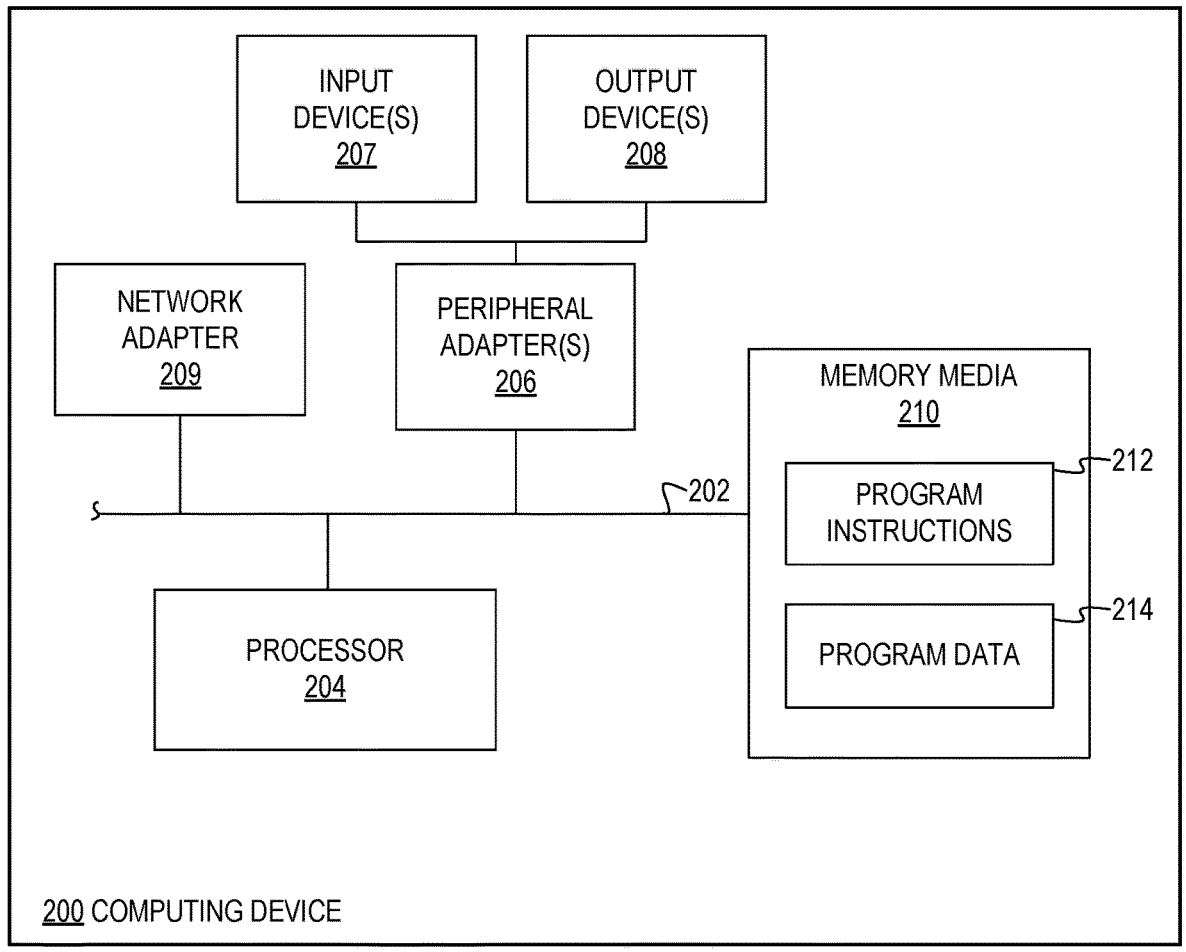
FIG. 2 is a block diagram of selected elements of computing device, according to some embodiments.

Referring now to FIG. 2, a block diagram illustrating selected elements of an example embodiment of a computing device 200 for performing dynamic stylus mode switching in an active stylus is presented. In different embodiments, computing device 200 may represent at least a portion of an information handling system, such as information handling system 100 illustrated in FIG. 1. In one embodiment, computing device 200 may implement the functionality of touch device 142 illustrated in FIG. 1. In another embodiment, computing device 200 may implement the functionality of stylus device 146 illustrated in FIG. 1. In the embodiment depicted in FIG. 2, device 200 includes processor 204 coupled via shared bus 202 to processor-accessible storage media collectively identified as memory media 210. In various embodiments, computing device 200 may include more, fewer, or different components than those illustrated in FIG. 2.

Device 200, as depicted in FIG. 2, further includes network adapter 209 that interfaces device 200 to a network (not shown in FIG. 2). Device 200, as depicted in FIG. 2, may include one or more peripheral adapters 206, which provide connectivity for the use of one or more input devices 207 and/or output devices 208. In an embodiment in which device 200 implements the functionality of touch device 142, input device 207 may represent a device for user input, such as a keyboard or a mouse, a video camera, a touch panel, or any of various buttons or other mechanical user interface mechanisms, for example. In an embodiment in which device 200 implements the functionality of stylus device 146, input device 207 may represent a device for user input, such as one or more buttons or other mechanical user interface mechanisms, or a backside eraser of a stylus device, for example. In an embodiment in which device 200 implements the functionality of touch device 142, output device 208 may represent a device for providing signals or indications to a user, such as a display panel or loudspeakers for generating audio signals. The display panel may, for example, be operable to display battery state-of-charge information for a stylus device 146 that is used in conjunction with the touch device 142. In an embodiment in which device 200 implements the functionality of stylus device 146, output device 208 may represent a device for providing signals or indications to a user such as an LED indicator of the battery state-of-charge for the stylus device. In another embodiment in which device 200 implements the functionality of stylus device 146, output device 208 may represent a device for providing signals or indications to a touch device 142 or to another component of an information handling system that includes stylus device 146.

In at least some embodiments, memory media 210 may represent non-transitory memory media, which may encompass persistent and volatile media, fixed and removable media, and magnetic and semiconductor media. As depicted in FIG. 2, memory media 210 may be operable to store program instructions 212, program data 214, or both. Memory media 210 is shown storing instructions 212, which may represent one or more sets of instructions embodying any one or more of the methods and/or operations described herein. It is noted that instructions 212 may also reside, completely or at least partially, within processor 204 during execution thereof by device 200 (not shown). It is further noted that processor 204 may be configured to receive instructions 212 from memory media 210 via shared bus 202. Memory media 210 is also shown storing program data 214, which may represent one or more sets data structures utilized by any one or more of the methods and/or operations described herein.

In an embodiment in which device 200 implements the functionality of touch device 142, program instructions 212 may include, for example, program instructions for determining when and whether the stylus mode of a multiple-mode active stylus should be switched. In such an embodiment, program data 214 may store data received from the stylus device (such as state-of-charge data or mode information), definitions of multiple stylus modes (which may include respective data structures storing information about which stylus features should be enabled and which stylus features should be disabled in each stylus mode), and/or any other data usable by the methods embodied in program instructions 212. In an embodiment in which device 200 implements the functionality of stylus device 146, program instructions 212 may include, for example, program instructions for receiving commands from a touch controller, and disabling and/or enabling various stylus features in accordance with those commands.

In some embodiments of the present disclosure, in a standard or default stylus mode, all stylus features implemented on a multiple-mode active stylus device, including all battery-consuming features, may be enabled. In various embodiments, these features may include any combination of stylus features including, but not limited to, determining and providing six degree-of-freedom data (including, e.g., spatial coordinates (x, y, z) and tilt/orientation/rotation information (such as roll, pitch, and yaw) for the stylus device to a touch controller), providing location information to the touch controller, responding to pressure levels, providing enhanced navigation capabilities while hovering above the screen and on-screen menus, responding to controls invoked through the manipulation of buttons or other mechanical user interface mechanisms on the stylus device, providing back-side digital eraser capability, providing blue-tooth capability for communicating with the touch controller or another component of an information handling system, providing laser pointing capability, and/or any other battery-consuming features suitable for inclusion on a multiple-mode active stylus device.

In various embodiments, different ones of the stylus features implemented on a stylus device may consume different amounts of battery power when they enabled and/or are in active use. For example, in a stylus device that includes back-side digital eraser capability, all the circuitry that is included in the "writing" end of the stylus device may be duplicated for the back-side digital eraser, and a writing application may apply negative ink instead of positive ink when the back-side digital eraser is in contact with, or in proximity to, a touch device. In this example, the use of the digital eraser may require that a transmitter for the back-side digital eraser is energized. Therefore, if the back-side digital eraser is disabled, the transmitter for the back-side digital eraser can be turned off, preserving battery power. In one embodiment, the stylus may include a single transmitter that is disabled in at least one low power stylus mode. In some embodiments and in some low power stylus modes, even if the single transmitter is disabled, a receiver may remain enabled in order to receive beacon signals from the touch controller.

In some embodiments, the stylus mode in which a multiple-mode stylus device operates may be application specific. In one example, an operating system executing on the information handling system may determine whether or not an application executing on the system supports and/or takes advantage of various battery-consuming stylus features. If not, the operating system may provide a hint that the stylus mode should be switched to a lower feature stylus mode in order to preserve battery power. In the lower feature stylus mode, stylus features such as navigation while hovering, tilt detection, and/or pressure sensing may be disabled. However, other features, such as the ability to capture signature, highlight text, or make selections while web browsing, some of which may not be battery-consuming features, may be enabled. In at least some embodiments, switching between stylus modes may be performed seamlessly, and the user may be able to use the stylus for digital inking without any performance impact.

In at least some embodiments, in order to support dynamically switching stylus modes in an active stylus, the system architecture may implement bi-directional communication between a touch controller and a stylus device. In at least some embodiments, a single touch controller may support both the standard capabilities of a touch device and communication with an active stylus to support dynamically switching stylus modes in the active stylus. For example, in some or all multiple-mode interactions the touch controller may be responsible for discovering a stylus device when it is in proximity to the touch device (e.g., when it is within the communication range of the touch device), establishing a communication link with the stylus device, configuring the stylus device in a suitable stylus mode and for further communication, and disconnecting the communication link when and if the stylus device moves out of proximity of the touch device, in which case it may switch to a low power stylus mode.

In at least some embodiments, a bi-directional touch controller may configure a stylus device in a particular stylus mode based on the current context in which the stylus device is operating. In some embodiments, the touch controller may periodically generate a beacon signal that is used as a communication path between the touch controller and the stylus device. The beacon signal may be served to discover the current stylus mode in which the stylus device is operating by transmitting commands to initiate two-way communication with the stylus device. In some embodiments, when the stylus device is within the communication range of the touch device and receives a beacon signal from the controller, it may respond to the beacon signal and may configure itself into a standard or default mode, such as a full-feature mode. If and when the stylus device is out of the communication range of the touch device, and stops receiving any beacon signals from the controller, it may switch to a low power mode. In some embodiments, the touch controller may communicate with the stylus device by periodically sending beacon signals to the stylus device (e.g., at fixed intervals of time). In such embodiments, when the stylus device is in proximity to the touch device and is in use, it may continue to listen to the beacon signals. If and when there is a change in the status of the stylus device (e.g., if the stylus device comes into proximity with the touch device or goes out of proximity of the touch device, or if a change is made through a user interface), the stylus device may switch stylus modes in response to receiving this information from the touch controller.

In some embodiments, a touch controller and/or a host device may communicate to the operating system via a software application programming interface (API) to switch the stylus mode of a multiple-mode active stylus device. For example, in some embodiments, the operating system may, through an API, provide a hint that an application executing on the system (such as a CAD program or a painting program in which the tilt of the stylus device or the pressure exerted by the stylus device on the touch device may affect the results) supports and/or takes advantage of various battery-consuming stylus features and, thus, the stylus device should be configured for operation in a full-feature mode. In another example, the operating system may, through an API, provide a hint that an application executing on the system (such as a note taking application) does not support or take advantage of at least some of the battery-consuming features of the stylus device and, thus, the stylus device should be configured for operation in a lower-feature mode. In other embodiments, such hints may be provided, through an API, by an application itself, rather than by the operating system.

In at least some embodiments, a multiple-mode active stylus device may be configured to accept commands from a touch controller directing the stylus device to switch stylus modes and to respond accordingly. For example, in various embodiments, the stylus device may include circuitry to receive a command to enter a low power stylus and, in response, to disable particular stylus features, such as by powering down various subsystems within the stylus device. In another example, the stylus device may include circuitry to receive a command to enter a full-feature stylus and, in response, to enable particular stylus features, such as by powering up various subsystems within the stylus device. In these examples, the stylus device may be architected so that at least some of its subsystems can be shut down and/or powered up independently, depending on the number of different stylus modes that are supported in the stylus device and the combinations of features that are enabled and/or disabled in each stylus mode.

In some embodiments, the ability to comprehend different stylus modes and commands for switching between them may be implemented in a protocol layer that is layered on top of a communication or transmission protocol through which the touch controller and stylus device exchange information.

Figure 3:
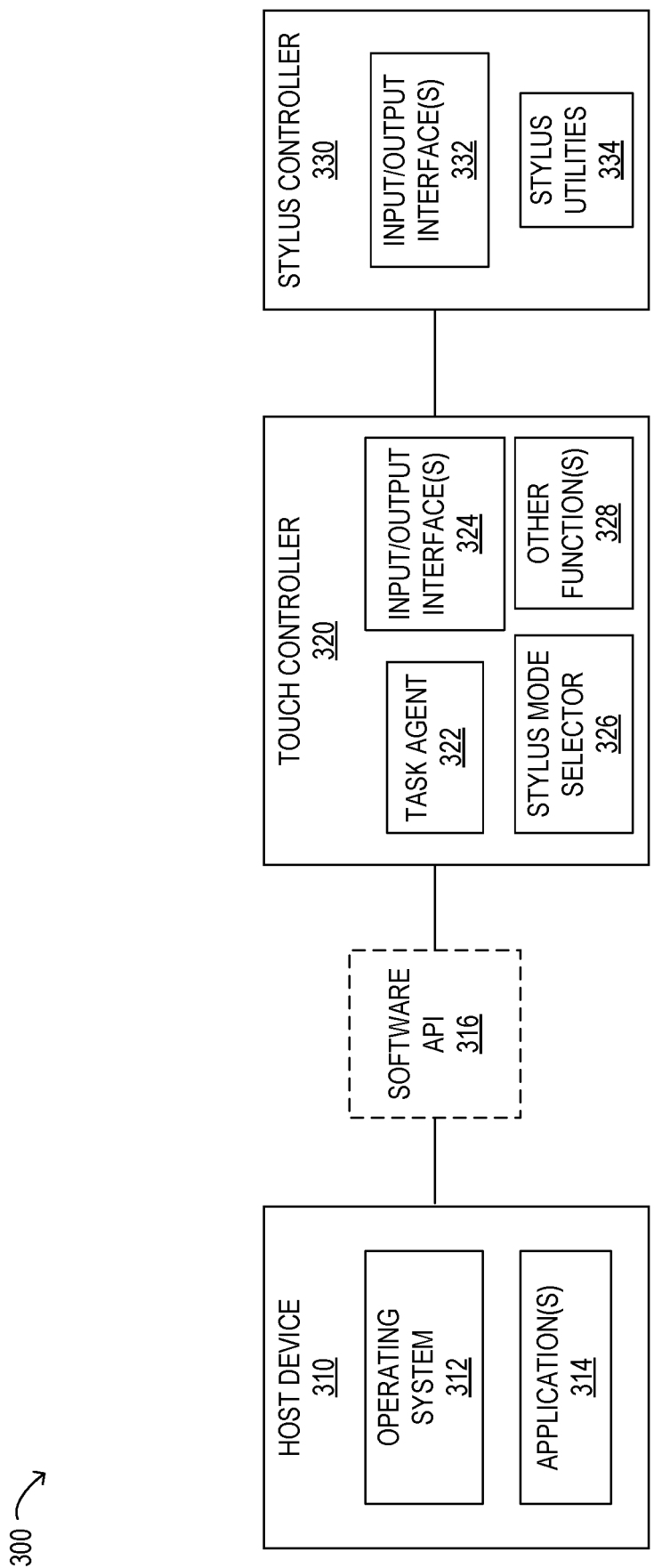
FIG. 3 is a block diagram illustrating relationships between selected hardware and software elements in an information handling system, according to some embodiments.

FIG. 3 is a block diagram illustrating relationships between selected hardware and software elements in an information handling system 300, according to some embodiments. as depicted in FIG. 3, the system may include a host device 310, on which an operating system 312 and one or more applications 314 are executing. The operating system 312 and/or applications 314 may communicate with a touch controller 320 through software API 316. For example, operating system 312 and/or applications 314 may provide hints to touch controller 320 about the current context in which a stylus device is being used and/or about the stylus mode in which the stylus should operate based on the current context.

In some embodiments, touch controller 320 may be similar to touch controller 144 illustrated in FIG. 1 and described above. As depicted in FIG. 3, touch controller 320 may include hardware elements that are controlled by various software elements. For example, touch controller 320 may include one or more input/output interfaces 324 to generate and receive signals and/or data. Some data, such as stylus mode hints, may be received from the host device by an input/output interface 324 through software API 316. In some embodiments, input/output interfaces 324 may generate beacon signals that are sent to stylus controller 330, as described herein.

As depicted in FIG. 3, touch controller 320 may include software elements such as a task agent 322, a stylus mode selector 326, and other functions 328. In some embodiments, task agent 322 may receive (or obtain) stylus mode hints and/or other information on which selection of a stylus mode may be based. For example, in some embodiments, task agent 322 may detect that an executing application is one that supports or takes advantage of at least some of the battery-consuming features of the stylus device and may select a stylus mode accordingly. In another example, task agent 322 may detect that an executing application is one that does not support or take advantage of at least some of the battery-consuming features of the stylus device and may select a stylus mode accordingly. In some embodiments, stylus mode selector 326 may, in response to inputs from task agent 322, generate commands to be sent to stylus controller 330 to configure the stylus device in the selected stylus mode.

As depicted in FIG. 3, the system includes a stylus controller 330. In some embodiments, stylus controller 330 may be similar to stylus controller 148 illustrated in FIG. 1 and described above. In some embodiments, stylus controller 330 may include hardware elements that are controlled by various software elements. For example, stylus controller 330 may include one or more input/output interfaces 334 to generate and receive signals and/or data. In some embodiments, input/output interfaces 334 may receive beacon signals that are sent to stylus controller 330 by touch controller 320, as described herein. In some embodiments, input/output interfaces 334 may generate responses to the beacon signals, including responses that include an indication of the stylus mode in which the stylus device is currently operating, and may send them to touch controller 320, as described herein. In some embodiments, input/output interfaces 334 may include one or more buttons or other mechanical user interface mechanisms that may be manipulated by a user to initiate a stylus mode switch or a switch between a digital inking mode and a digital erasing mode. In one embodiment, input/output interfaces 334 may include one or more LEDs or other indicators of the state-of-charge of a stylus battery, the current stylus mode, or other status information for the stylus device. As depicted in FIG. 3, stylus controller 330 may include stylus utilities 334, such as software utilities for controlling the circuitry within a stylus device. In some embodiments, stylus utilities 334 may include functions for disabling (e.g., powering down) or enabling (e.g., powering up) various subsystems of the stylus device that implement respective battery-consuming stylus features. In various embodiments, system utilities 334 may disable and/or enable particular battery-consuming stylus features or collections of battery-consuming stylus features in response to receiving a command from touch controller 320 to switch stylus modes or in response to an input received through a user interface mechanism that represents such a command.

Figure 4:
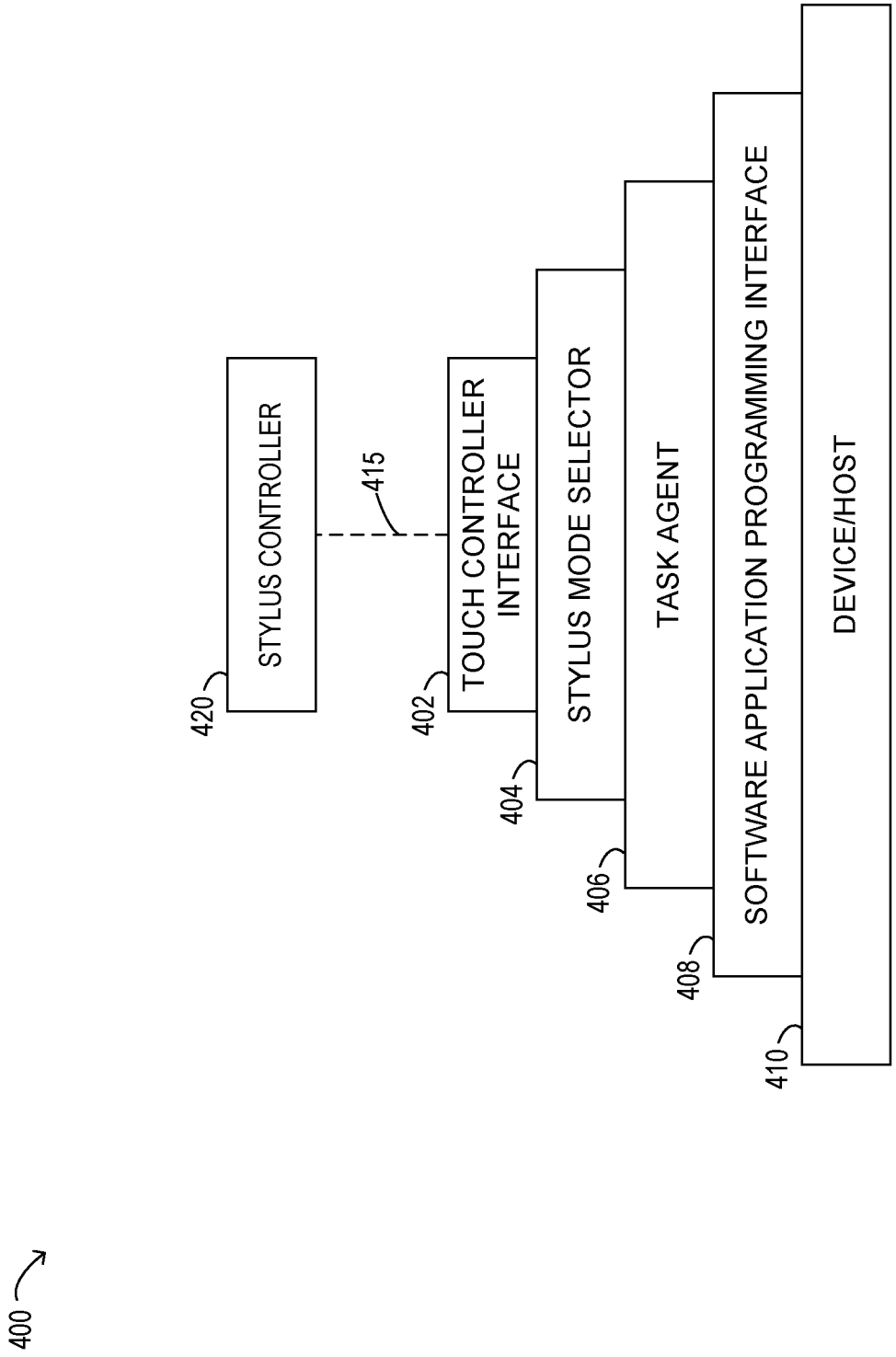
FIG. 4 is a block diagram illustrating an abstraction of multiple software layers in an information handling system, according to some embodiments.

FIG. 4 is a block diagram illustrating an abstraction of multiple software layers in an information handling system, according to some embodiments. In this example, software stack 400 includes a device/host layer 410, a software application programming interface (API) layer 408, a task agent layer 406, a stylus mode selector layer 404, a touch controller interface layer 402, and a stylus controller layer 420, which may be implemented on a stylus device that is separate from the computer system on which the other software layers are implemented.

In some embodiments, API layer 408 may implement the functionality of software API 316 in FIG. 3, task agent layer 406 may implement the functionality of task agent 322 illustrated in FIG. 3, stylus mode selector layer 404 may implement the functionality of stylus mode selector 326, touch controller interface layer 402 may implement the functionality of one or more input/output interfaces 324 (and/or other functions 328) illustrated in FIG. 3, and stylus controller layer 420 may implement at least a portion of the functionality of stylus controller 330 illustrated in FIG. 3.

In this example embodiment, in order to affect a change in the stylus mode of a stylus device, relevant data may pass between the software layers illustrated in FIG. 4 in order from bottom to top. For example, data generated at device/host layer 410 (such as stylus mode hint information) may pass through software interface layer 408 to task agent layer 406. Program instructions executing at task agent layer 406 may then generate data indicating a selection of a stylus mode based on the information received from device/host 410 through software interface layer 408 and on other criteria. Task agent layer 406 may pass the data indicating the selection of the stylus mode to stylus mode selector layer 404. Program instructions executing at stylus mode selector layer 404 may generate the commands to be sent to stylus controller 420 to configure the stylus device for operation in the selected stylus mode. These commands may be provided to touch controller interface layer 402 for communication with stylus controller layer 420.

As depicted in FIG. 4, system 400 may include a communication interface 415. In at least some embodiments, communication interface 415 may be bi-directional communication interface between a stylus device and a touch device or, more specifically, between a touch controller and a stylus controller, as described herein. In some embodiments, data and/or commands indicating the selection of a stylus mode may be sent by the touch controller to the stylus controller (e.g., within a beacon signal). In some embodiments, battery state-of-charge information and/or data indicating the current stylus mode may be sent from the stylus control layer 420 back to the device/host layer through the other layers illustrated in FIG. 4 in order from top to bottom.

Figure 5:
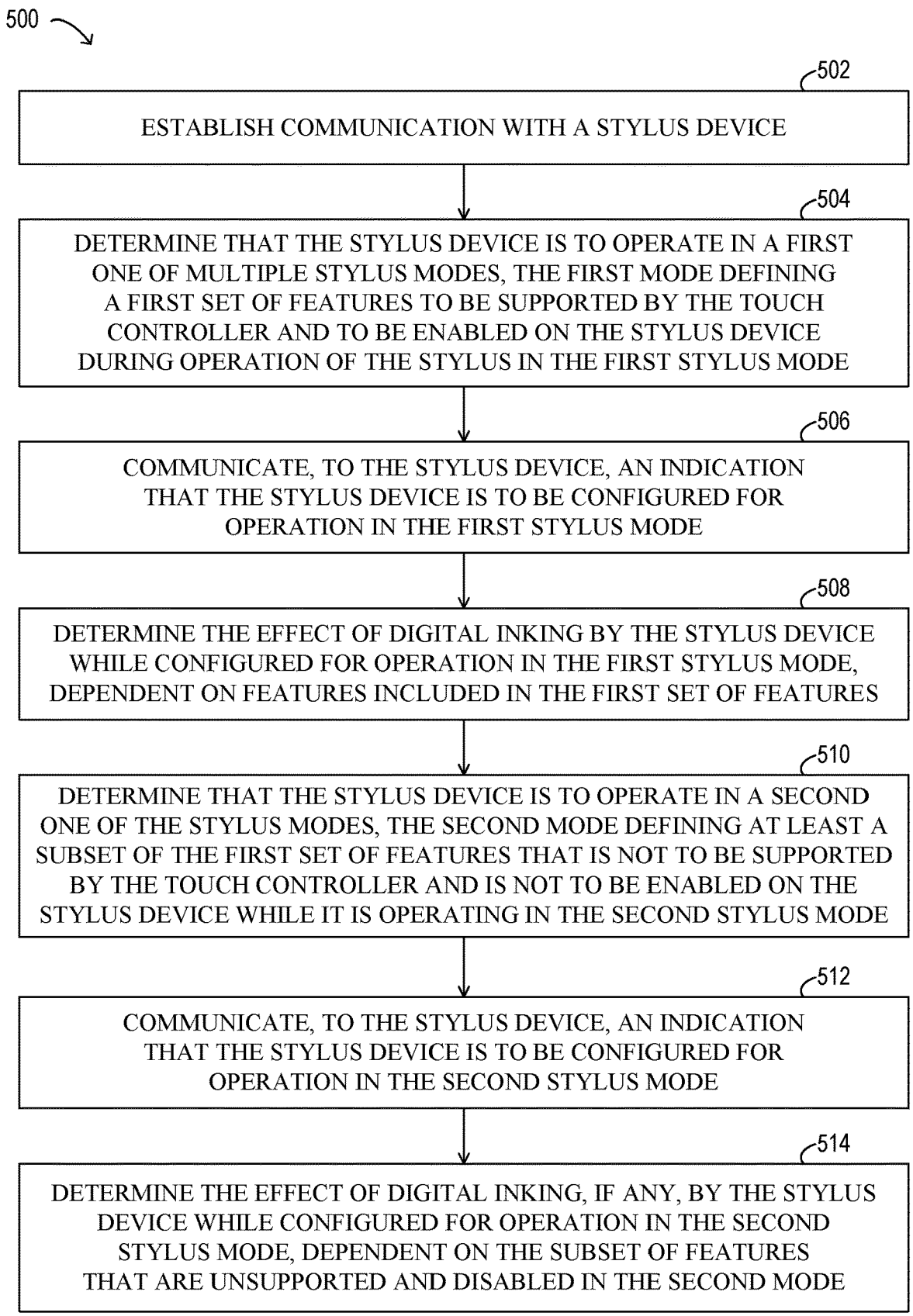
FIG. 5 is flow diagram depicting selected elements of an embodiment of a method for dynamically switching the mode in which a stylus device operates, according to some embodiments.

FIG. 5 is flow diagram depicting selected elements of an embodiment of a method 500 for dynamically switching the mode in which a stylus device operates, according to some embodiments. In some embodiments, method 500 may be performed by a touch controller, such as touch controller 144 illustrated in FIG. 1 or touch controller 320 illustrated in FIG. 3. In some embodiments, method 500 may be implemented by hardware circuitry, which may include any suitable combination of static (fixed-function), dynamic, and/or programmable logic devices. In other embodiments, one or more of the operations of method 500 may be performed or emulated by the execution of program instructions by a processor. Method 500 may include greater or fewer operations than those illustrated. Moreover, method 500 may execute its operations in an order different than those illustrated in FIG. 5. Method 500 may begin at any suitable operation and may terminate at any suitable operation. In some embodiments, method 500 may repeat operation at any suitable operation. Furthermore, method 500 may be executed multiple times to dynamically switch the mode in which a stylus device operates. During the execution of method 500, other methods may be invoked to perform at least some of the operations of method 500.

As depicted in FIG. 5, method 500 may begin (at 502) by establishing communication with a stylus device. For example, a touch controller may transmit signals to, or exchange signals with, the stylus device (or an interface or stylus controller thereof) in accordance with any suitable transmission protocol to establish a communication link. In at least some embodiments, the stylus device may be an active stylus device. Method 500 may include, (at 504) determining that the stylus device is to operate in a first one of multiple stylus modes, where the first stylus mode defines a first set of features to be supported by the touch controller and to be enabled on the stylus device during operation of the stylus in the first stylus mode. In some embodiments, the first stylus mode may be a full-featured mode in which all stylus features implemented on the stylus device are enabled. In other embodiments, a subset of all stylus features implemented on the stylus device may be enabled when the stylus operates in the first stylus mode.

Method 500 may include (at 506) communicating, to the stylus device, an indication that the stylus device is to be configured for operation in the first stylus mode. As described in more detail herein, in some embodiments, the indication of the stylus mode may be included in a beacon signal that is transmitted from a touch controller to a stylus device (or to a stylus controller thereof). Method 500 may also include (at 508) determining the effect of any digital inking by the stylus device (e.g., on the touch device) while the stylus device is configured for operation in the first stylus mode. Determining the effect of any digital inking may be dependent on which stylus features implemented on the stylus device are included in the first set of features that are enabled in the first stylus mode.

Method 500 may include (at 510) determining that the stylus is to operate in a second one of the multiple stylus modes, where the second stylus mode defines at least a subset of the first set of features that is not to be supported by the touch controller and is not to be enabled on the stylus device while it is operating in the second stylus mode. For example, in an embodiment in which the first stylus mode is a full-featured mode in which all stylus features, including those features that are battery-consuming, implemented on the stylus device are enabled, only a subset of the stylus features implemented on the stylus device may be enabled when the stylus operates in the second stylus mode. In an embodiment in which a subset of all stylus features implemented on the stylus device are enabled when the stylus operates in the first stylus mode, at least of subset of the stylus features enabled in the first stylus mode may be disabled when the stylus operates in the second stylus mode. In some embodiments, some or all battery-consuming stylus features may be disabled when the stylus operates in the second stylus mode, preserving battery life.

Method 500 may include (at 512) communicating, to the stylus device, an indication that the stylus device is to be configured for operation in the second stylus mode. As before, the indication of the stylus mode may be included in a beacon signal that is transmitted from a touch controller to a stylus device (or to a stylus controller thereof). Method 500 may also include (at 514) determining the effect of any digital inking by the stylus device (e.g., on the touch device) while the stylus device is configured for operation in the second stylus mode. Determining the effect of any digital inking may be dependent on which stylus features are supported by the touch controller and enabled on the stylus device and which stylus features are unsupported by the touch controller and/or disabled on the stylus device when the stylus device is operating in the second stylus mode. In an embodiment in which the determination to switch to the second stylus mode is dependent on determining that the stylus device is no longer in proximity to the touch device (e.g., if it is out of range), there may be no digital inking performed while the stylus device is out of range.

In some embodiments of the systems described herein, the information handling system, or a display device or touch device thereof, may include a camera. For example, the system may include a three-dimensional (3D) camera. In such embodiments, the system may be able to determine whether a gesture made using a stylus device indicates a stylus mode in which the stylus device is to operate. In one embodiment, the touch controller may include circuitry or logic to detect a movement, a position, or an orientation of the stylus device that represents a gesture associated with a particular stylus mode. In another embodiment, a movement, a position, or an orientation of a stylus device, as captured by a camera, may provide a hint to the touch controller about the way in which the stylus device is being used with an executing application or the stylus features that are supported or employed by the application. This hint may inform the selection of an appropriate stylus mode in which to operate the stylus device.

In some embodiments, the multiple-mode active stylus devices described herein may include a specific capacitance touch feature that is dependent on the size or shape of its tip. In some embodiments, as the stylus device approaches a touch device, and based on the context of its use, the position, orientation, or tilt of the stylus device may affect the digital inking response. For example, in some embodiments and for some applications, the orientation or tilt of the stylus device may affect the width of a line drawn in response to the digital inking or another characteristic of the line (e.g., its color or texture). In this example, a stylus mode in which information about the orientation or tilt of the stylus device is captured by the stylus device and is provided to the touch controller may be selected. In other embodiments or for other applications, the width of a line drawn in response to the digital inking by the stylus may be fixed, and may not be affected by the position, orientation, or tilt of the stylus device. In this example, a stylus mode in which the stylus device does not capture this information nor provide it to the touch controller may be selected.

While several examples of bi-modal stylus devices, in which only a single full-feature stylus mode and a single low power or lower feature stylus mode are implemented, are described herein, in other embodiments, a multiple-mode active stylus device may implement more than two stylus modes. For example, a multiple-mode active stylus device may implement a full-feature stylus mode and two or more low power or lower feature stylus modes, each of which defines a respective collection of stylus features, including battery-consuming features, that are enabled or that are disabled on the stylus device. Each such collection of stylus features, including battery-consuming features, may be suitable for a respective type or class of applications, such as painting applications, CAD applications, document creating applications, or presentation building applications. For example, a pressure sensing feature may be included in a stylus mode that is used for painting applications, but not in a stylus mode that is used for document creating applications. In one of the low power or lower feature stylus modes, all battery-consuming stylus features may be disabled (e.g., powered down).

In some embodiments, if a stylus feature that is supported by an application is disabled (e.g., in order to preserve battery life), the stylus may still be functional when used in that application, but may yield different results. For example, if the pressure sensing feature is disabled while the stylus device is being used in a painting application, the lines drawn using digital inking may have a fixed width, rather than a width that is variable according to the amount of pressure exerted by the stylus device on the touch device. In some embodiments, in order to preserve battery power, the stylus features that consume the most power may be disabled first (e.g., in response to receiving an indication that the state-of-charge of the stylus battery is below a predetermined threshold value). For example, in a stylus device in which the subsystem that senses tilt uses a 6 or 9 axis sensor, a relatively large amount of power may be saved by disabling the entire subsystem. On the other hand, in an embodiment in tilt is sensed by the touch controller (e.g., by reading the pattern that the electrostatic field from the stylus device imprints on the sensor), rather than by the stylus device itself, there may be little to no power savings realized on the stylus in response to disabling the tilt sensing feature.

Figure 6:
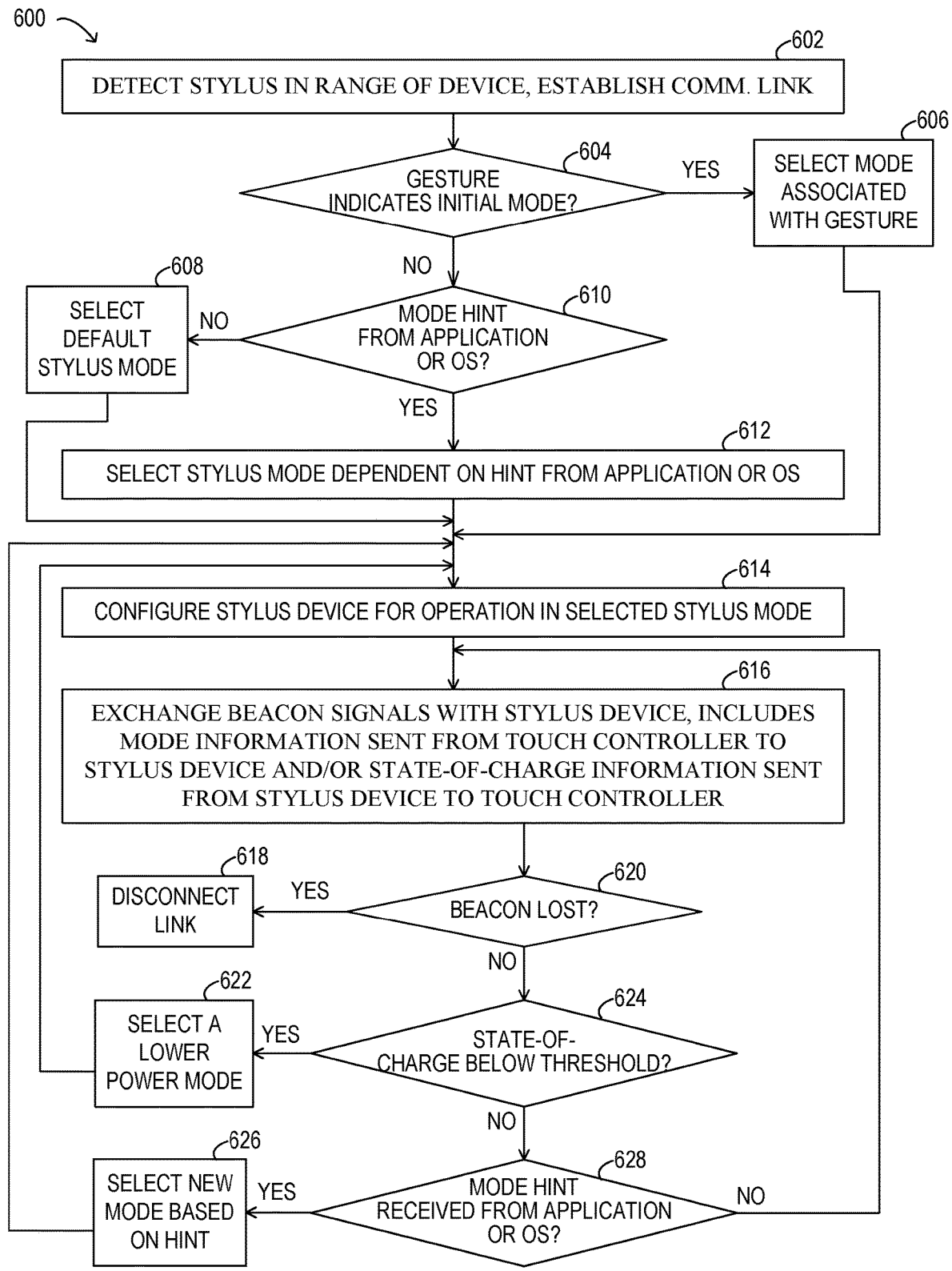
FIG. 6 is flow diagram depicting selected elements of an embodiment of a method for automatically switching the mode in which a stylus device operates, according to some embodiments.

FIG. 6 is flow diagram depicting selected elements of an embodiment of a method 600 for automatically switching the mode in which a stylus device operates, according to some embodiments. In some embodiments, method 600 may be performed by a touch controller, such as touch controller 144 illustrated in FIG. 1 or touch controller 320 illustrated in FIG. 3 in conjunction with a stylus controller, such as stylus controller 148 illustrated in FIG. 1 or stylus controller 330 illustrated in FIG. 3. In some embodiments, method 600 may be implemented by hardware circuitry, which may include any suitable combination of static (fixed-function), dynamic, and/or programmable logic devices. In other embodiments, one or more of the operations of method 600 may be performed or emulated by the execution of program instructions by a processor. Method 600 may include greater or fewer operations than those illustrated. Moreover, method 600 may execute its operations in an order different than those illustrated in FIG. 6. Method 600 may begin at any suitable operation and may terminate at any suitable operation. In some embodiments, method 600 may repeat operation at any suitable operation. Furthermore, method 600 may be executed multiple times to automatically switch the mode in which a stylus device operates. During the execution of method 600, other methods may be invoked to perform at least some of the operations of method 600.

As depicted in FIG. 6, method 600 may begin (at 602) by detecting that a stylus device is in range of a touch device, and establishing a communication link between the two devices. The stylus device may be a multiple-mode stylus device. In at least some embodiments, the stylus device may be an active stylus device. Method 600 may include (at 604) determining whether a gesture made using the stylus device indicates an initial stylus mode in which the stylus device is to operate. In some embodiments, the touch controller may include circuitry or logic to detect a movement, a position, or an orientation of the stylus device that represents a gesture associated with the first stylus mode. In one example, a touch device may include a camera, and the touch controller may be configured to determine, based on one or more still images or video frames captured by the camera, that a gesture made using the stylus device during an initialization period indicates an initial stylus mode in which the stylus device is to operate.

If it is determined that a gesture made using the stylus device indicates an initial stylus mode in which the stylus device is to operate, method 600 may include (at 606) selecting the stylus mode associated with the gesture. Otherwise, method 600 may proceed to 610. If (at 610) a stylus mode hint is obtained from, or on behalf of, an executing application or operating system, method 600 may proceed to 612. Otherwise, method 600 may proceed to 608. For example, in some embodiments, a stylus mode hint may be received from an application or operating system through a software application programming interface (API). In some embodiments, an operating system utility or task agent may, based on knowledge of the stylus features supported by the operating system or an executing application, generate a stylus mode hint. For example, if an operating system utility or task agent determines that an executing application is a CAD program, it may generate a stylus mode hint indicating that a full-feature stylus mode may be more suitable than a lower feature stylus mode. In another example, if an operating system utility or task agent determines that an executing application is a note taking application, it may generate a stylus mode hint indicating that a lower feature stylus mode may be more suitable than a full-feature stylus mode. Method 600 may include (at 612) selecting a stylus mode in which the stylus device is to operate dependent on the hint obtained from, or on behalf of, the application or operating system.

Method 600 may include (at 608) selecting a default stylus mode as the stylus mode in which the stylus device is to operate. In some embodiments, the default stylus mode may be a full-feature stylus mode. In other embodiments, only a subset of the features implemented on the stylus device may be enabled in the default stylus mode. In still other embodiments, some or all battery-consuming stylus features may be disabled in the default stylus mode, which may extend the battery life of the stylus device.

Method 600 may include (at 614) configuring the stylus device for operation in the selected stylus mode. In some embodiments, configuring the stylus device may include sending one or more commands to the stylus device (or to a stylus controller thereof) to enable and/or disable various stylus features, in accordance with the selected stylus mode. Method 600 may include (at 616) exchanging beacon signals with the stylus device. In some embodiments, exchanging beacon signals may include sending signals representing mode information from the touch controller to the stylus device (or stylus controller thereof) and/or sending battery state-of-charge information from the stylus device to the touch controller. In some embodiments, the beacon signals may be transmitted or exchanged periodically as part of one way or two-way protocol to determine whether the communication link is still active. If (at 620) it is determined that the beacon is lost, method 600 may include the touch controller disconnecting the communication link with the stylus device (as in 618). Otherwise, method 600 may proceed to 624.

If (at 624) it is determined that the battery state-of-charge of the stylus device is below a predetermined state-of-charge threshold, method 600 may include selecting a lower power stylus mode than the one in which the stylus device is currently operating (as in 622) in order to preserve battery life, and then returning to 614. If (at 624) it is determined that the battery state-of-charge of the stylus device is not below a predetermined state-of-charge threshold, method 600 may proceed to 629. If (at 628) a stylus mode hint is received from, or on behalf of, an executing application or operating system, method 600 may include selecting new stylus mode based on that hint (as in 626), after which method 600 may return to 614. Otherwise, method 600 may return to 616. From that point, method 600 may include continuing to exchange beacon signals with the stylus device, some of which may include mode information sent from the touch controller to the stylus device or state-of-charge information sent from the stylus device to the touch controller, until and unless the beacon signal is lost (as in 620) or other conditions indicate that the mode should be changed (as in 624 or 628), at which point the stylus mode may be switched accordingly.

In some embodiments of the present disclosure, rather than the method for dynamically switching stylus modes in an active stylus device being performed automatically, for the most part, at least some operations may be performed with some user input. For example, in some embodiments, the stylus device may provide state-of-charge information to the touch controller or to another component of, or application executing on, a host system. In some embodiments, a utility or application executing on the host may display an indication of the state-of-charge of the stylus battery. In other embodiments, a utility or application executing on the host may display an indication that the stylus battery is approaching depletion level. For example, an operating system utility with access to the state-of-charge information received from the stylus device may display a pop-up window through which the user is alerted about the status of the stylus battery. In still other embodiments, the stylus device may include an LED or another type of indicator that provides an alert when the stylus battery is approaching depletion level. In any of these embodiments, the stylus device user may initiate switching the stylus mode to a lower feature mode than the stylus mode in which the stylus device is currently operating in order to preserver battery power.

In some embodiments, initiating switching the stylus mode may include initiating the switch using a button or other mechanical user interface mechanism on the stylus device itself. In one embodiment, a stylus utility for enabling and/or disabling particular battery-consuming stylus features may be invoked by the user. In another embodiment, a stylus utility may be invoked to send a stylus mode switching command (or a request for such a command) to the touch controller. In some embodiments, initiating switching the stylus mode may include selecting an operation to switch the stylus mode through a GUI of a utility or application executing on the host. In some embodiments, both an highly-automated method for dynamically switching stylus modes in an active stylus device and a less-automated (or manual) method for dynamically switching stylus modes in an active stylus device may be supported in the touch controller, in the stylus device, and/or on the host system. In some such embodiments, the less-automated (or manual) method for dynamically switching stylus modes may, if invoked by the user, override the automated method.

Figure 7:
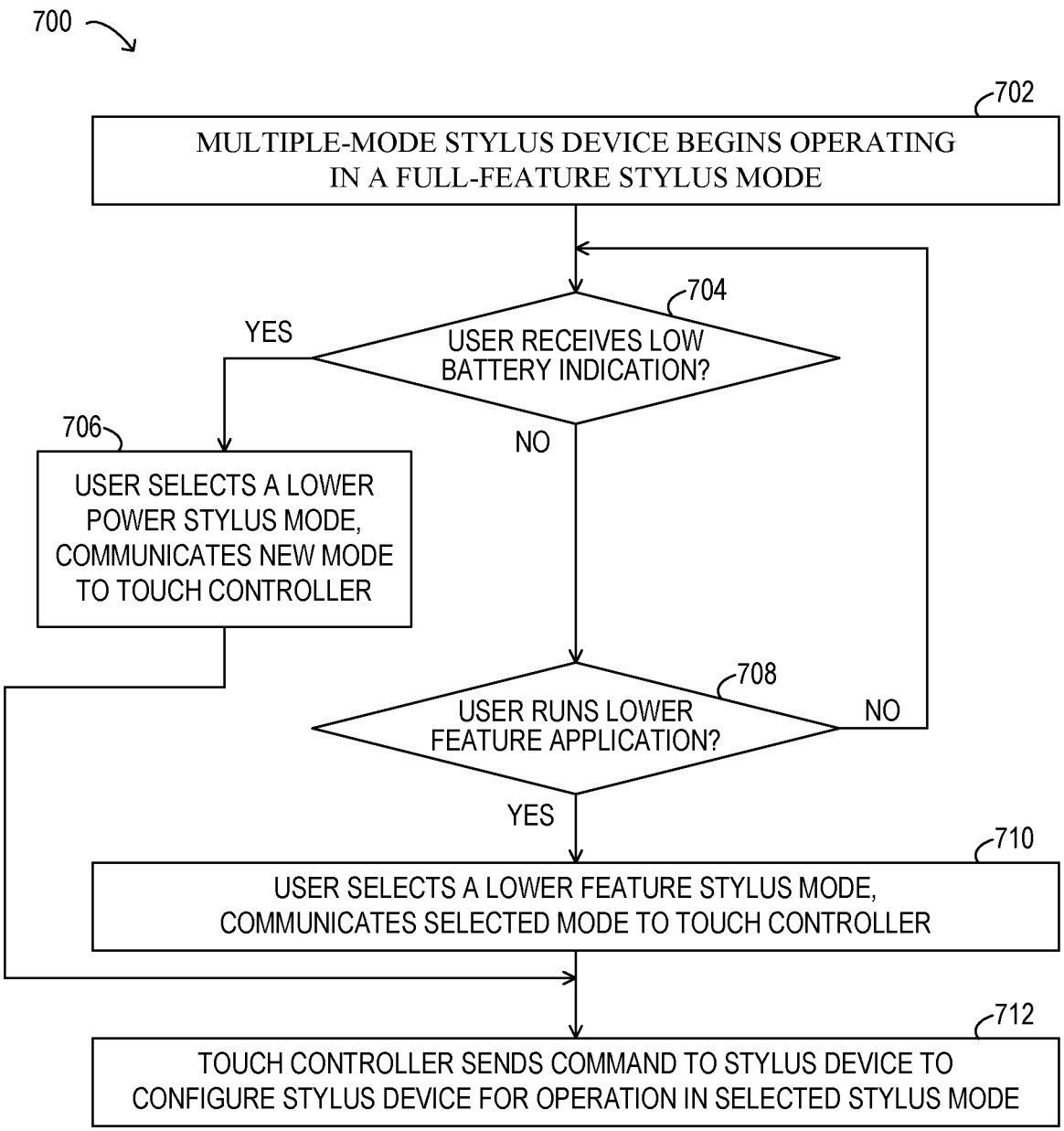
FIG. 7 is flow diagram depicting selected elements of an embodiment of a method for manually switching the mode in which a stylus device operates, according to some embodiments.

FIG. 7 is flow diagram depicting selected elements of an embodiment of a method 700 for manually switching the mode in which a stylus device operates, according to some embodiments. In some embodiments, some portions of method 700 may be performed by a touch controller, such as touch controller 144 illustrated in FIG. 1 or touch controller 320 illustrated in FIG. 3 in conjunction with a stylus controller, such as stylus controller 148 illustrated in FIG. 1 or stylus controller 330 illustrated in FIG. 3, while other portions of method 700 may include actions taken by a user of the stylus device. In some embodiments, portions of method 700 may be implemented by hardware circuitry, which may include any suitable combination of static (fixed-function), dynamic, and/or programmable logic devices. In other embodiments, one or more of the operations of method 700 may be performed or emulated by the execution of program instructions by a processor. Method 700 may include greater or fewer operations than those illustrated. Moreover, method 700 may execute its operations in an order different than those illustrated in FIG. 7. Method 700 may begin at any suitable operation and may terminate at any suitable operation. In some embodiments, method 700 may repeat operation at any suitable operation. Furthermore, method 700 may be executed multiple times to manually switch the mode in which a stylus device operates. During the execution of method 700, other methods may be invoked to perform at least some of the operations of method 700.

As depicted in FIG. 7, method 700 may include (at 702) a multiple-mode stylus device beginning to operate in a full-feature stylus mode. In at least some embodiments, the stylus device may be an active stylus device. If (at 704) a user of the stylus device receives an indication that the state-of-charge of a battery that provides power to the stylus device is low, method 700 may proceed to 706. Otherwise, method 700 may proceed to 708. In one example embodiment, the user may receive an alert or other indication that the state-of-charge of the battery is low through a graphical user interface (GUI) for an executing application or operating system. In another example embodiment, the user may be presented (e.g., through a GUI) with a bar graph or other representation of the current state-of-charge of the battery and may observe that the battery is being depleted. At 706, the user may select a lower power stylus mode than the full-feature stylus mode in which it is operating, and may communicate the result of the selection to a touch controller (as in 706). In some embodiments, there may be two or more low power stylus modes from which to select, each of which defines a respective subset of the available stylus features to be enabled or disabled. In such embodiments, the user may select a low power stylus mode based on the amount of power it is likely to save through the disabling of one or more battery-consuming stylus features, or based on the stylus features that the user does or does not need when using the stylus device with a particular application. In some embodiments, the selection may be communicated to the touch controller through a GUI.

If (at 708) the user begins running a lower feature application (i.e., an application that is not configured to support nor take advantage of all of the stylus features implemented by the stylus device), the user may select a lower feature stylus mode and may communicate the result of the selection to a touch controller (as in 710). In some embodiments, the user may select one of multiple lower feature stylus modes based on the amount of power it is likely to save through the disabling of one or more battery-consuming stylus features, or based on the stylus features that the user does or does not need when using the stylus device with a particular application. In some embodiments, the selection may be communicated to the touch controller through a GUI.

In embodiments in which a new stylus mode is selected, method 700 may include (at 712) the touch controller sending a command to the stylus device to configure the stylus device for operation in the selected stylus mode. In some embodiments, this may include transmitting a beacon signal into which stylus mode information has been encoded. As depicted in FIG. 7, if (or while) neither of the conditions shown in 704 and 708 is met, method 700 may repeat beginning at 704 until and unless one of these conditions is met.

As previously noted, in at least some embodiments, a stylus controller may receive, through a user input mechanism of a stylus device, an indication that the stylus mode in which the stylus device is operating should be changed, and may communicate that indication to the touch controller.

Figure 8:
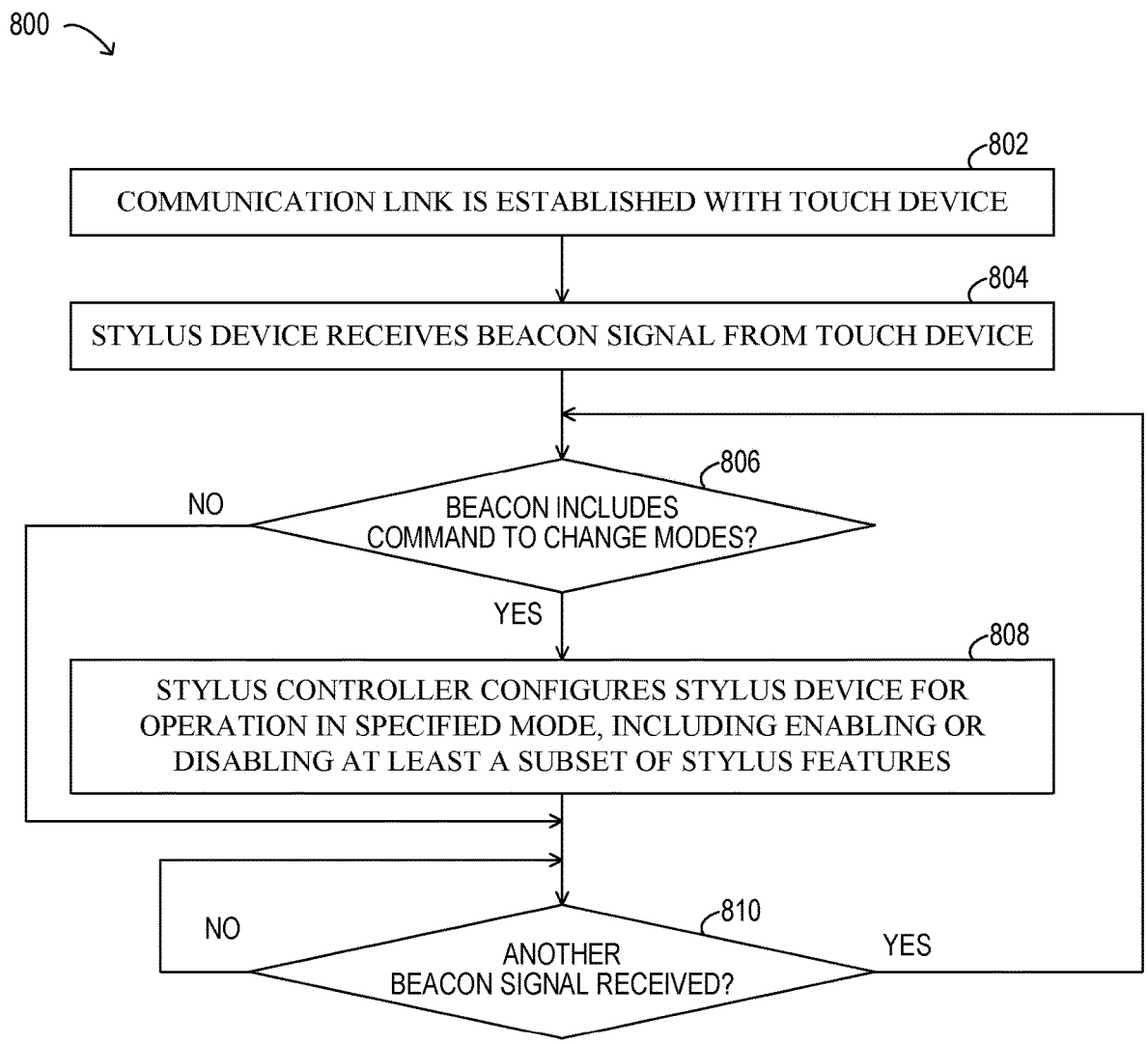
FIG. 8 is flow diagram depicting selected elements of an embodiment of a method for operating a multiple-mode active stylus device, according to some embodiments.

FIG. 8 is flow diagram depicting selected elements of an embodiment of a method for operating a multiple-mode active stylus device, according to some embodiments. In some embodiments, method 800 may be performed by a stylus controller, such as stylus controller 148 illustrated in FIG. 1 or stylus controller 330 illustrated in FIG. 3. In some embodiments, method 800 may be implemented by hardware circuitry, which may include any suitable combination of static (fixed-function), dynamic, and/or programmable logic devices. In other embodiments, one or more of the operations of method 800 may be performed or emulated by the execution of program instructions by a processor. Method 800 may include greater or fewer operations than those illustrated. Moreover, method 800 may execute its operations in an order different than those illustrated in FIG. 8. Method 800 may begin at any suitable operation and may terminate at any suitable operation. In some embodiments, method 800 may repeat operation at any suitable operation. Furthermore, method 800 may be executed multiple times to a operate multiple-mode active stylus device. During the execution of method 800, other methods may be invoked to perform at least some of the operations of method 800.

As depicted in FIG. 8, method 800 may begin (at 802) by establishing a communication link with a touch device. For example, in some embodiments, establishing a communication link with a touch device may include receiving one or more transmissions from a touch device (or from a touch controller through an input/output interface thereof) representing a handshake, according to a suitable communication or transmission protocol. Once the communication link is established, method 800 may include (at 804) receiving a beacon signal from the touch device. In some embodiments, such a beacon signal may be sent from the touch controller to the stylus device periodically (e.g., at fixed time intervals).

If (at 806) the beacon signal includes a command to change the stylus mode of the stylus device, method 800 may include the stylus controller configuring the stylus device for operation in the specified mode, which may include enabling and/or disabling at least a subset of the stylus features implemented on the stylus device (as in 808). For example, in some embodiments, the beacon signal may include an encoding representing the stylus mode in which the stylus device should operate, as determined by the touch controller. In some embodiments, each periodic beacon signal may include an encoding representing the stylus mode in which the stylus device should be operating. In such embodiments, if the stylus mode indicated in a given beacon signal is not the stylus mode in which the stylus device is currently operating, the stylus controller may re-configure the stylus device for operation in the specified mode, which may include enabling and/or disabling at least some of the stylus features implemented on the stylus device.

If (at 806) the beacon signal does not include a command to change stylus modes, the operation shown at 808 may be skipped. If and when (at 810) another beacon signal is received, method 800 may return to 806. As depicted in FIG. 8, in some embodiments, until and unless another beacon signal is received, the stylus controller may take no action to change the stylus mode in which it is operating.

In at least some embodiments of the present disclosure, the techniques described herein may be used to switch stylus modes even when doing so would reduce the functionality of the stylus device when used with a currently executing application. For example, a user may, based on the state-of-charge of the stylus battery, decide to purposely reduce functionality in order to switch into a power-saving stylus mode.

In some embodiments, particular applications may include, within the program instructions that implement them, instructions to cause the stylus mode to be switched from one mode to another to support the operations that take place while executing different portions of the code. For example, instructions according a software API for dynamically switching the stylus mode to a full-feature stylus mode may be inserted at the beginning of a section of code for performing a stylus-feature-intensive operation, such as a module in which inputs to a painting program using the stylus device are captured. Subsequently, instructions according a software API for dynamically switching the stylus mode to a lower feature stylus mode may be inserted at the beginning of a section of code for performing a less stylus-feature-intensive operation, such as a module for capturing text entered through a GUI or for performing calculations based on the data captured during a stylus-feature-intensive operation.

Several examples included herein describe techniques for dynamically switching stylus modes in an active stylus device as a modal operation in which the stylus device is configured to operate in one stylus mode at a time for all executing applications. In other embodiments, dynamic stylus mode switching may be performed on a window-by-window basis. For example, if there is a stylus-feature-intensive application running in a first window and a less stylus-feature-intensive application running in a second window, the stylus mode may be switched when the stylus device moves from one window to the other. In other words, in some embodiments, if the user is inking within a particular window, the operating system may determine which application is executing in that window and may provide a stylus mode hint to configure the stylus device in a stylus mode that is suitable for use with that application.

As described herein, an active stylus device may operate in any of multiple stylus modes, some of which may preserve the battery life of the stylus device by disabling one or more battery-consuming features of the stylus device. In some embodiments, a touch controller may determine that a stylus device can or should change stylus modes. In other embodiments, the stylus device itself may determine that it can or should change the stylus mode in which it is operating. In some embodiments, if the stylus mode in which a multiple-mode active stylus device is operating is changed from a full-feature mode to a low power or lower feature mode, the battery life of the stylus device may be extended, leading to a better user experience. A software API may allow an operating system or application running on the host system to provide stylus mode hints. A bi-directional communication link between a touch device and a stylus device may allow the touch controller to configure the stylus device for operation in a selected stylus mode and may allow the stylus device to provide information to the touch controller upon which selection of the stylus mode may be dependent.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a touch controller;
   a touch device including circuitry for enabling, in conjunction with the touch controller, input to the information handling system via touch functionality;
   wherein the touch controller comprises circuitry to:
   establish a communication link with a stylus device to be used with the touch device;
   determine that the stylus device is to operate in a first one of a plurality of stylus modes, wherein the first stylus mode defines a first set of stylus features implemented on the stylus device to be supported on the touch controller and enabled on the stylus device when the stylus device operates in the first stylus mode, the first set including one or more stylus features that, when enabled, consume power supplied by a stylus battery and affect a visually distinguishable characteristic of lines drawn by the stylus using digital inking;
   communicate, to the stylus device, an indication that the stylus device is to be configured for operation in the first stylus mode;
   determine, while the stylus device operates in the first stylus mode, an effect of digital inking by the stylus device on the touch device, dependent on the one or more battery-consuming stylus features included in the first set of stylus features;
   determine that the stylus device is to operate in a second one of the plurality of stylus modes, wherein the stylus device consumes less power when operating in the second stylus mode than when operating in the first stylus mode, and the second stylus mode defines a subset of the first set of stylus features that are to be disabled on the stylus device in the second stylus mode;
   communicate, to the stylus device, in response to the determination that the stylus device is to operate in the second stylus mode, an indication that the stylus device is to be configured for operation in the second stylus mode; and
   determine, while the stylus device operates in the second stylus mode, an effect of digital inking by the stylus device on the touch device, dependent on the one or more battery-consuming stylus features that remain enabled when the stylus device operates in the second stylus mode.

2. The information handling system of claim 1, wherein:
   to determine that the stylus device is to operate in the first stylus mode, the touch controller comprises circuitry to:
   detect that the stylus device has come into proximity with the touch device; and
   select, as an initial stylus mode, the first stylus mode;
   the first stylus mode comprises a default stylus mode in which all battery-consuming stylus features implemented on the stylus device are enabled.

3. The information handling system of claim 1, wherein:
   to determine that the stylus device is to operate in the first stylus mode, the touch controller comprises circuitry to detect a movement, a position, or an orientation of the stylus device that represents a gesture associated with the first stylus mode.

4. The information handling system of claim 1, wherein:
   to determine that the stylus device is to operate in the first stylus mode, the touch controller comprises circuitry to determine that a first application executing on the information handling system supports use of one or more of the battery-consuming stylus features that are included in the first subset of stylus features and are to be disabled on the stylus device when the stylus device operates in the second stylus mode; and
   to determine that the stylus device is to operate in the second stylus mode, the touch controller comprises circuitry to determine that a second application executing on the information handling system does not support use of the one or more battery-consuming stylus features that are to be disabled on the stylus device when the stylus device operates in the second stylus mode.

5. The information handling system of claim 1, wherein:
   to determine that the stylus device is to operate in the second stylus mode, the touch controller comprises circuitry to receive, from the stylus device, information representing a state-of-charge of a battery providing energy to the stylus device, the information indicating that the state-of-charge of the battery is below a predetermined state-of-charge threshold.

6. The information handling system of claim 1, wherein:
   to communicate, to the stylus device, an indication that the stylus device is to be configured for operation in the first stylus mode, the touch controller comprises circuitry to transmit a beacon signal to the stylus device, the beacon signal encoding information representing a command to configure the stylus device for operation in the first stylus mode.

7. The information handling system of claim 1, wherein:
   the information handling system further comprises a stylus controller, the stylus controller comprising circuitry to:
   receive, from the touch controller, the indication that the stylus device is to be configured for operation in the first stylus mode;
   configure the stylus device for operation in the first stylus mode, including circuitry to enable the stylus features in the first subset of stylus features;
   receive, from the touch controller, the indication that the stylus device is to be configured for operation in the second stylus mode; and
   configure the stylus device for operation in the second stylus mode, including circuitry to disable the one or more battery-consuming stylus features that are to be disabled on the stylus device when the stylus device operates in the second stylus mode.

8. The information handling system of claim 1, wherein:
   the information handling system further comprises a stylus controller, the stylus controller comprising circuitry to:
   configure the stylus device for operation in the second stylus mode in response to:
   a determination that the stylus device is not in proximity to the touch device; or
   a determination that a state-of-charge of a battery providing energy to the stylus device is below a predetermined state-of-charge threshold.

9. The information handling system of claim 1, wherein:
the information handling system further comprises a stylus controller, the stylus controller comprising circuitry to:
  receive, from a user input mechanism of the stylus device, an indication that the stylus device is to operate in the second stylus mode; and
  transmit a beacon signal to the touch controller, the beacon signal encoding information indicating that the stylus device is to be configured for operation in the second stylus mode;
to determine that the stylus device is to operate in the second stylus mode, the touch controller comprises circuitry to receive, from the stylus device, the beacon signal encoding information indicating that the stylus device is to be configured for operation in the second stylus mode.

10. A method comprising, in an information handling system:
establishing a communication link between a touch controller and a stylus device, the stylus device to be used with a touch device to provide input to the information handling system;
determining that the stylus device is to operate in a first one of a plurality of stylus modes, wherein the first stylus mode defines a first set of stylus features implemented on the stylus device to be supported on the touch controller and enabled on the stylus device when the stylus device operates in the first stylus mode, the first set including one or more stylus features that, when enabled, consume power supplied by a stylus battery and affect a visually distinguishable characteristic of lines drawn by the stylus using digital inking;
communicating, to the stylus device, an indication that the stylus device is to be configured for operation in the first stylus mode;
determining, while the stylus device operates in the first stylus mode, an effect of digital inking by the stylus device on the touch device, dependent on the one or more battery-consuming stylus features included in the first set of stylus features;
determining that the stylus device is to operate in a second one of the plurality of stylus modes, wherein the stylus device consumes less power when operating in the second stylus mode than when operating in the first stylus mode, and the second stylus mode defines a subset of the first set of stylus features that are to be disabled on the stylus device in the second stylus mode;
communicating, to the stylus device, in response to the determination that the stylus device is to operate in the second stylus mode, an indication that the stylus device is to be configured for operation in the second stylus mode; and
determining, while the stylus device operates in the second stylus mode, an effect of digital inking by the stylus device on the touch device, dependent on the one or more battery-consuming stylus features that remain enabled when the stylus device operates in the second stylus mode.

11. The method of claim 10, wherein:
determining that the stylus device is to operate in the first stylus mode comprises:
  detecting that the stylus device has come into proximity with the touch device; and
  selecting, as an initial stylus mode, the first stylus mode;
the first stylus mode comprises a default stylus mode in which all battery-consuming stylus features implemented on the stylus device are enabled.

12. The method of claim 10, wherein:
determining that the stylus device is to operate in the first stylus mode comprises determining that the stylus device is to operate in the first stylus mode, the touch controller comprises circuitry to determine that a first application executing on the information handling system supports use of one or more of the battery-consuming stylus features that are included in the first subset of stylus features and are to be disabled on the stylus device when the stylus device operates in the second stylus mode; and
determining that the stylus device is to operate in the second stylus mode comprises determining that a second application executing on the information handling system does not support use of the one or more battery-consuming stylus features that are to be disabled on the stylus device when the stylus device operates in the second stylus mode.

13. The method of claim 10, wherein:
determining that the stylus device is to operate in the second stylus mode comprises receiving, from the stylus device, information representing a state-of-charge of a battery providing energy to the stylus device, the information indicating that the state-of-charge of the battery is below a predetermined state-of-charge threshold.

14. The method of claim 10, wherein:
communicating, to the stylus device, an indication that the stylus device is to be configured for operation in the first stylus mode comprises transmitting a beacon signal to the stylus device, the beacon signal encoding information representing a command to configure the stylus device for operation in the first stylus mode.

15. The method of claim 10, further comprising:
configuring the stylus device for operation in the first stylus mode, including enabling the stylus features in the first subset of stylus features, in response to the indication that the stylus device is to be configured for operation in the first stylus mode; and
configuring the stylus device for operation in the second stylus mode, including disabling the one or more battery-consuming stylus features that are to be disabled on the stylus device when the stylus device operates in the second stylus mode, in response to the indication that the stylus device is to be configured for operation in the stylus mode.

16. At least one non-transitory, computer-readable medium storing program instructions that when executed by one or more processors cause the processors to perform:
establishing a communication link between a touch controller for a touch device and a stylus device to be used with the touch device;
determining that the stylus device is to operate in a first one of a plurality of stylus modes, wherein the first stylus mode defines a first set of stylus features implemented on the stylus device to be supported on the touch controller and enabled on the stylus device when the stylus device operates in the first stylus mode, the first set including one or more stylus features that, when enabled, consume power supplied by a stylus battery and affect a visually distinguishable characteristic of lines drawn by the stylus using digital inking;

communicating, to the stylus device, an indication that the stylus device is to be configured for operation in the first stylus mode;

determining, while the stylus device operates in the first stylus mode, an effect of digital inking by the stylus device on the touch device, dependent on the one or more battery-consuming stylus features included in the first set of stylus features;

determining that the stylus device is to operate in a second one of the plurality of stylus modes, wherein the stylus device consumes less power when operating in the second stylus mode than when operating in the first stylus mode, and the second stylus mode defines a subset of the first set of stylus features that are to be disabled on the stylus device in the second stylus mode;

communicating, to the stylus device, in response to the determination that the stylus device is to operate in the second stylus mode, an indication that the stylus device is to be configured for operation in the second stylus mode; and determining, while the stylus device operates in the second stylus mode, an effect of digital inking by the stylus device on the touch device, dependent on the one or more battery-consuming stylus features that remain enabled when the stylus device operates in the second stylus mode.

17. The medium of claim 16, wherein:

determining that the stylus device is to operate in the first stylus mode comprises:
  determining that the stylus device has come into proximity with the touch device; and
  selecting, as an initial stylus mode, the first stylus mode;

the first stylus mode comprises a default stylus mode in which all battery-consuming stylus features implemented on the stylus device are enabled.

18. The medium of claim 16, wherein:

determining that the stylus device is to operate in the first stylus mode comprises receiving, through an application programming interface, information indicating that a first application executing on the one or more processors supports use of one or more of the battery-consuming stylus features that are included in the first subset of stylus features and are to be disabled on the stylus device when the stylus device operates in the second stylus mode; and determining that the stylus device is to operate in the second stylus mode comprises receiving, through an application programming interface, information indicating that a second application executing on the one or more processors does not support use of the one or more battery-consuming stylus features that are to be disabled on the stylus device when the stylus device operates in the second stylus mode.

19. The medium of claim 16, wherein:

determining that the stylus device is to operate in the second stylus mode comprises receiving, from the stylus device, information representing a state-of-charge of a battery providing energy to the stylus device, the information indicating that the state-of-charge of the battery is below a predetermined state-of-charge threshold.

20. The medium of claim 16, wherein:

communicating, to the stylus device, an indication that the stylus device is to be configured for operation in the first stylus mode comprises sending, to the stylus device, information representing a command to configure the stylus device for operation in the first stylus mode.

* * * * *